United States Patent Office 3,729,440
Patented Apr. 24, 1973

3,729,440
THERMALLY STABLE POLYCARBONATE
Frank N. Liberty, Mount Vernon, Ind., assignor to
General Electric Company
No Drawing. Filed Jan. 4, 1971, Ser. No. 103,824
Int. Cl. C08g 51/58
U.S. Cl. 260—45.7 P                                   5 Claims

ABSTRACT OF THE DISCLOSURE

A thermally stable aromatic polycarbonate composition which is stabilized with a minor amount of a phosphinite, which phosphinite has the general following formula:

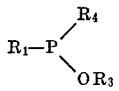

Preferably, the phosphinite is ethyl diphenyl phosphinite. The composition may also have included with it an epoxy compound having the following formula:

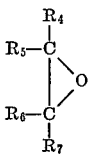

This invention relates to thermally stable polycarbonate compositions and more particularly to polycarbonate compositions having minor amounts of a phosphinite with or without a particular epoxy compound.

It is known to incorporate various phosphites with polymers as disclosed in U.S. Pat. 3,305,520 and phosphites with tetraaryl tin as shown in Canadian Pat. 727,-700. However, these references deal solely with phosphites such as triaryl and trialkyl phosphites. Due to increased molding temperatures and use temperatures of molded shapes of polycarbonates, it is increasingly more important to prepare polycarbonates having increased stability to thermal degradation or discoloration due to elevated temperatures. Phosphonites have been known to provide stabilization for polycarbonates as disclosed in copending application Ser. No. 28,054, filed Apr. 13, 1970.

Therefore, it has been surprisingly discovered that by employing minor amounts of a phosphinite with a polycarbonate, thermally stable polycarbonate compositions are obtained.

Therefore, it is an object of the instant invention to provide a thermally stable polycarbonate.

Another object of this invention is to provide a thermally stable polycarbonate stabilized with minor amounts of a phosphinite present.

Yet another object of this invention is to provide a thermally stable polycarbonate composition having in admixture a polycarbonate, minor amounts of a phosphinite and an epoxy.

These and other objects of this invention will become apparent from the following detailed description thereof.

Briefly, according to this invention, the foregoing and other objects are attained by combining with a polycarbonate, minor amounts of a phosphinite of the formula:

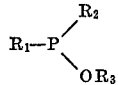

wherein $R_1$, $R_2$ and $R_3$ are independently selected from the group consisting of unsubstituted and halogen substituted aryl, alkyl, cycloalkyl, aralkyl and alkaryl radicals of 1–25 carbon atoms. In addition, the above polymer may have in admixture therewith a particular epoxy compound.

The following examples are set forth to illustrate more clearly the principle and practice of this invention to those skilled in the art. Unless otherwise specified, where parts or percents are mentioned, they are parts or percent by weight.

EXAMPLE I

To a reactor fitted with a refluxed condenser and mechanical agitator, a charge of 1320 parts of methylene chloride, 113 parts of 2,2-bis(4-hydroxyphenyl) propane, 120 parts of calcium hydroxide, 2 parts of p-tertiary butylphenol, 0.05 part of triethylamine and 0.104 part of ethyl diphenyl phosphinite are added. The slurry is stirred and phosgene is added at a rate of about 60 parts/hr. The phosgene addition is terminated after 53 minutes. The polymer is recovered in solid form by filtering and precipitated with methanol. The product is dried overnight. Three and one-half (3.5) grams of the dried polymer composition above are sealed in a combustion tube under a pressure of 26 inches of mercury. The tubes are heated in an aluminum block at 600° F. for 15 minutes. The tubes are then cooled and the contents thereof are dissolved in 25 ml. of distilled methylene chloride. The percent transmission through the solution is measured against the percent transmission through distilled methylene chloride at 425 nanometers. The higher the transmission, the lower is the discoloration of the polymer which, in turn, means better thermal stability of the polymer to discoloration. The results are as follows:

|  | Percent transmission |
|---|---|
| Sample | 81.0 |
| Control | 74.3 |

The transmission is measured through a 23 mm. cell in a Fisher Electrophotometer.

EXAMPLE II

Example I is repeated except that 0.41 part of ethyl diphenyl phosphinite is employed herein instead of 0.104 part as set forth in Example I.

The results obtained are essentially the same as in Example I.

EXAMPLE III

To polycarbonate powder as prepared in Example I, above, by reacting equimolar amounts of 2,2-bis(4-hydroxyphenyl)-propane and phosgene in an organic medium, mix 0.08 weight percent of 3,4-epoxycyclohexylmethyl 3,4-epoxycyclohexane carboxylate based on the weight of the polycarbonate in a blender. The blend is dried overnight at 125° C. and extruded at about 530° F. into pellets using a screw extruder.

EXAMPLE IV

The composition of Example III is injection molded into test specimens 3″ x 2″ x ⅛″ thick at 650° F. and 700° F. separately. As a control, a polycarbonate without phosphinite and epoxy additives of the type as employed in Example III is also molded into test specimens. Separate test specimens of each are heat aged at 140° C. for 7 days. The test specimens are then measured for thermal stability to discoloration in accordance with ASTM Yellowness Index Test D1925–63T. The lower the number, the lower is the discoloration of the polymer and therefore the better is the thermal stability of the polymer to discoloration.

The results are as follows:

TABLE 1

|  | Yellowness Index | | | |
|---|---|---|---|---|
|  | As molded | | Heat aged | |
|  | 650° F. | 700° F. | 650° F. | 700° F. |
| Sample | 2.4 | 2.6 | 4.1 | 5.0 |
| Control | 4.3 | 4.9 | 11.2 | 11.3 |

The instant invention is directed to a thermally stable polymer composition and more particularly to a thermally stable polycarbonate composition stabilized with a minor amount of a phosphinite of the formula:

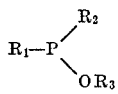

wherein $R_1$, $R_2$ and $R_3$ are independently selected from the group consisting of unsubstituted and halogen substituted alkyl, aryl, cycloalkyl, aralkyl and alkaryl radicals of 1–25 carbon atoms. Preferably, the amount of phosphinite present is 0.005 to about 1.0 weight percent and more particularly 0.01 to about 0.2 weight percent based on the weight of the polycarbonate.

In addition, the invention is directed to admixing therewith an epoxy composition represented by the following formula:

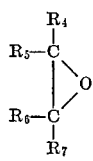

As stated previously, the phosphinite employed in the instant invention is the type set forth previously wherein $R_1$, $R_2$ and $R_3$ may be alkyl such as methyl, ethyl, n-propyl, isopropyl, n-butyl, sec-butyl, tertiary butyl, n-amyl, isoamyl, tertiary amyl, n-hexyl, dodecyl, nonyl, etc.; cycloalkyl such as cyclohexyl, 2-methylcyclohexyl, 4-methylcyclohexyl, 2-ethylcyclohexyl, 4-ethylcyclohexyl, 4-isopropylcyclohexyl, etc.; aryl such as phenyl, naphthyl, 2-naphthyl, biphenyl of terphenyl, etc.; aralkyl such as benzyl, phenylethyl, 2-phenylethyl, 1-phenylpropyl 2-phenylpropyl, etc.; and alkaryl such as p-tolyl, m-tolyl, 2,6-xylyl, o-tolyl, p-cumyl, m-cumyl, o-cumyl, mesityl, p-tertiary butylphenyl; haloaryl such as 2-chlorophenyl, 2,4,6-trichlorophenyl, 2,4,6-tribromophenyl, etc.; and the substituted portions thereof may be halogen atoms. The phosphinite employed herein may be added either to reaction vessel with the monomer employed to prepare the polycarbonate or it may be added after the reaction has started or it may be added at the end of the reaction or it may be blended with the dry polycarbonate powder obtained from the reaction. Preferably, it has been found to blend the phosphinite with the polycarbonate powder and then extrude the molding pellets therefrom.

In the practice of this invention, other phosphinites that can be employed in place of the ethyl diphenyl phosphinite in the examples with essentially the same results are p-nonylphenyl diphenyl phosphinite, phenyl diphenyl phosphinite and iso-decyl diphenyl phosphinite. Preferably, the phosphinite employed in the practice of this invention is ethyl diphenyl phosphinite.

The epoxy compound employed herein is of the type set forth in the above-described formula, namely:

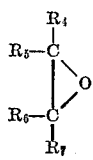

wherein $R_4$, $R_5$, $R_6$ and $R_7$ are indenpendently selected from the group consisting of hydrogen, alkyl, cycloalkyl, aryl, substituted aryl and heterocyclic organic radicals wherein the organic radicals have a carbon content of 1 to 24 carbon atoms. While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperatures employed in preparing molded articles from the composition of this invention.

The amount of epoxy employed in the practice of this invention can vary from 0.01 to 0.5 weight percent based on the weight of the polymer composition and is preferably 0.03 to 0.1 weight percent. While more than 0.5 weight percent of epoxy can be employed, it has been found that higher amounts tend to degrade the physical properties of the polycarbonate and thereby reduce the usefulness of the polymer in providing tough, flexible molded articles.

In the practice of this invention, other epoxy compounds that have been employed in place of the 3,4-epoxycyclohexylmethyl 3,4-epoxycyclohexane carboxylate in the examples with essentially the same results are 3,4-epoxy-6-methylcyclohexylmethyl 3,4-epoxy-6 - methylcyclohexane carboxylate, 2,3-epoxycyclohexylmethyl 3,4 - epoxycyclohexane carboxylate, 4-(3,4-epoxy - 5 - methylcyclohexyl) butyl 3,4-epoxycyclohexane carboxylate, 3,4-epoxycyclohexyl ethylene oxide, cyclohexylmethyl 3,4-epoxy-cyclohexane carboxylate, 3,4-epoxy-6-methylcyclohexylmethyl-6-methylcyclohexyl carboxylate, di-3,4-epoxy-6-methylcyclohexylmethyl adipate, bisphenol-A diglycidyl ether, tetrabromobisphenol-A diglycidyl ether, diglycidyl ester of phthalic acid, diglycidyl ester of hexahydrophthalic acid, bis-epoxy dicyclopentadienyl ether of ethylene glycol, epoxidized soybean oil, epoxidized linseed oil, bis-epoxycyclohexyl adipate, butadiene diepoxide, tetraphenylethylene epoxide, indene oxide, octyl epoxy tallate, cyclododecene epoxide and epoxidized polybutadiene. Preferably the epoxy compound employed in the practice of this invention is 3,4 - epoxycyclohexylmethyl 3,4 - epoxycyclohexane carboxylate.

The dihydric phenols that can be employed herein to prepare the polycarbonates are bisphenols such as bis(4-hydroxyphenyl) methane, 2,2-bis(4-hydroxyphenyl) propane, 2,2-bis(4-hydroxy-3-methylphenyl) propane, 4,4-bis-(4-hydroxyphenyl) heptane, 2,2 - bis(4 - hydroxy 3,5-dichlorophenyl) propane, 2,2-bis(4-hydroxy 3,5-dibromophenyl) propane, etc.; dihydric phenol ethers such as bis-(4-hydroxyphenyl) ether, bis(3,5-dichloro - 4 - hydroxyphenyl) ether, etc., dihydroxydiphenols such as p,p'-dihydroxydiphenyl, 3,3'-dichloro-4,4'-dihydroxydiphenyl, etc., dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy - 2 - chlorobenzene, 1,4 - dihydroxy 2,5 - dichlorobenzene, 1,4 - dihydroxy - 3 - methylbenzene, etc., and dihydroxy diphenyl sulfoxides such as bis - (4 - hydroxyphenyl) sulfoxide, bis - (3,5 - dibromo - 4 - hydroxyphenyl) sulfoxide, etc. A variety of additional dihydric phenols are also available to provide carbonate polymers and are disclosed in U.S. Pats. 2,999,835; 3,028,365 and 3,153,008. It is of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can be an hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, para-tertiarybutylphenol, para-bromophenol, etc. Preferably, para-tertiarybutylphenol is employed as the molecular weight regulator.

In the broad sense of the instant invention, it is understood that other additives may be employed that are commonly used in preparing polycarbonates. These are such additives as glass fibers or filaments, sized or unsized, pigment colorants, mineral fillers such as quartz or silica, etc. Also, when preparing molding compositions of the type prepared by comminuting the extrudate of a screw extruder, a vented extruder may be employed wherein the polymer may be vented to the atmosphere or to a vacuum or to a pressure in excess of atmospheric.

It will thus be seen that the objects set forth above among those made apparent from the preceding description are efficiently attained, and since certain changes may be in carrying out the above process and in the composition set forth without departing from the scope of this invention, it is intended that all matters contained in the above descripion shall be interpreted as illustrative and in a limiting sense.

What is claimed is:

1. A thermally stable aromatic polycarbonate composition stabilized with minor amounts of a phosphinite of the following formula:

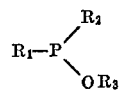

wherein $R_1$, $R_2$ and $R_3$ are independently selected from the group consisting of unsubstituted and halogen-substituted alkyl, aryl, cycloalkyl, aralkyl and alkaryl radicals of 1–25 carbon atoms.

2. The composition of claim 1 wherein the phosphinite is present in an amount of 0.005 to about 1.0 weight percent based on the weight of the aromatic polycarbonate composition.

3. The composition of claim 1 wherein the phosphinite is present in an amount of 0.01 to about 0.2 weight percent based on the weight of the aromatic polycarbonate composition.

4. The composition of claim 1 wherein the phosphinite is ethyl diphenyl phosphinite.

5. The composition of claim 1 wherein the phosphinite is p-nonylphenyl diphenyl phosphinite.

References Cited
UNITED STATES PATENTS

| | | | |
|---|---|---|---|
| 3,305,520 | 2/1967 | Fritz et al. | 260—45.7 |
| 3,595,835 | 7/1971 | Pilz et al. | 260—45.85 |
| 3,314,920 | 4/1967 | Sakurai et al. | 260—75 |
| 3,061,583 | 10/1962 | Huhn et al. | 260—45.7 |
| 3,297,631 | 1/1967 | Bown et al. | 260—45.95 |
| 3,498,946 | 3/1970 | Calkins | 260—37 |
| 3,420,801 | 1/1969 | Fitz | 260—75 |
| 3,446,763 | 5/1969 | Okuzumi | 260—22 |
| 3,489,716 | 1/1970 | Calkins | 260—45.8 |

DONALD E. CZAJA, Primary Examiner

R. A. WHITE, Assistant Examiner

U.S. Cl. X.R.

260—45.8 A